(12) United States Patent
Funaoka et al.

(10) Patent No.: US 7,824,577 B2
(45) Date of Patent: Nov. 2, 2010

(54) ELECTRICALLY CONDUCTIVE POLYANILINE COMPOSITION, PROCESS FOR PRODUCING THE SAME AND POLYANILINE DOPANT

(75) Inventors: Masamitsu Funaoka, Mie (JP); Mitsuru Aoyagi, Mie (JP); Isao Murakumo, Aichi (JP)

(73) Assignee: Japan Science and Technology Agency, Kawaguchi-Shi (JP)

( * ) Notice: Subject to any disclaimer, the term of this patent is extended or adjusted under 35 U.S.C. 154(b) by 823 days.

(21) Appl. No.: 10/592,403

(22) PCT Filed: Mar. 10, 2005

(86) PCT No.: PCT/JP2005/004706

§ 371 (c)(1),
(2), (4) Date: May 30, 2007

(87) PCT Pub. No.: WO2005/085355

PCT Pub. Date: Sep. 15, 2005

(65) Prior Publication Data

US 2008/0017832 A1    Jan. 24, 2008

(30) Foreign Application Priority Data

Mar. 10, 2004   (JP) .............................. 2004-067999
Mar. 10, 2004   (JP) .............................. 2004-068000

(51) Int. Cl.
*H01B 1/12* (2006.01)
(52) U.S. Cl. ....................................... 252/500; 528/422
(58) Field of Classification Search ................. 252/500; 528/210–214, 422
See application file for complete search history.

(56) References Cited

U.S. PATENT DOCUMENTS

| | | | |
|---|---|---|---|
| 5,520,852 A | 5/1996 | Ikkala et al. | |
| 5,736,623 A | 4/1998 | Angelopoulos et al. | |
| 5,773,568 A | 6/1998 | MacDiarmid et al. | |
| 5,968,417 A | 10/1999 | Viswanathan | |
| 6,299,800 B1 | 10/2001 | Visiwanathan | |

(Continued)

FOREIGN PATENT DOCUMENTS

EP    1 022 283 A1    7/2000

(Continued)

OTHER PUBLICATIONS

M. Sudhakar et al., "Conducting, Waterborne Lingosulfonic Acid-Doped Polyanilie," American Chemical Society, No. 735, 1999, pp. 76-87.

(Continued)

*Primary Examiner*—Mark Kopec
(74) *Attorney, Agent, or Firm*—Oliff & Berridge, PLC

(57) ABSTRACT

The invention provides a polyaniline dopant which has small environmental load and from which an electrically conductive polyaniline having better processability on polyaniline can be obtained. A phenol derivative of lignin having a bis (aryl)propane unit in which a carbon atom on an ortho-position and/or a para-position relative to a phenolic hydroxy group of a phenol compound is bound to a carbon atom on a C1-position of an aryl propane unit of lignin is used as a polyaniline dopant. Since a phenol derivative of lignin is derived from a source that can be recycled, the dopant is a polyaniline dopant having small environmental load.

27 Claims, 2 Drawing Sheets

Natural lignin

Phenol compound/acid
Example: p-cresol/sulfuric acid

Part of typical lignophenol derivative
(aryl–propane unit)

U.S. PATENT DOCUMENTS 6,632,931 B1    10/2003  Funaoka
6,841,660 B1 *   1/2005  Funaoka .................... 530/502
6,972,098 B1 * 12/2005  Viswanathan ............... 252/500

FOREIGN PATENT DOCUMENTS

| | | |
|---|---|---|
| JP | A 2-233701 | 9/1990 |
| JP | A 8-231862 | 9/1996 |
| JP | A 10-501017 | 1/1998 |
| JP | A 2004-027066 | 1/2004 |
| WO | WO 95/34080 | 12/1995 |
| WO | WO 99/14233 A1 | 3/1999 |

OTHER PUBLICATIONS

P. Rodrigues et al., "Polyaniline/Lingin Blends: Thermal Analysis and XPS," European Polymer Journal, vol. 37, 2001, pp. 2217-2223.

P. Rodrigues et al., "Polyaniline/Lingin Blends: FTIR, MEV and Electrochemical Characterization," European Polymer Journal, vol. 38, 2002, pp. 2213-2217.

* cited by examiner

Natural lignin

Phenol compound / acid
Example: p-cresol / sulfuric acid

Part of typical lignophenol derivative
(aryl-propane unit)

ELECTRICALLY CONDUCTIVE POLYANILINE COMPOSITION, PROCESS FOR PRODUCING THE SAME AND POLYANILINE DOPANT

BACKGROUND ART

Since polyaniline has better electrically conducting property when doped, additionally, is easily obtained from an inexpensive aniline polymer simply and at a high yield, and is chemically stable, it is being studied in a variety of fields, and application development thereof is being tried. In order that polyaniline exhibits electrical conductivity, as shown in FIG. 2, generally, it is necessary that polyaniline in a non-electrically conductive base form undergo protonation with a dopant. However, since in polyaniline in a non-electrically conductive base form, a p-conjugation system is generally developed, polyaniline is insoluble in almost all organic solvents and water, and, therefore, protonation itself is difficult.

As a dopant for polyaniline, generally, in order to effectively perform protonation, a sulfate ion (e.g. JP-A H02-233701), as well as a strong acid anion such as a hydrochloride ion, a nitrate ion and a phosphate ion are used. In addition, an organic dopant is also known (Patent Document 2). It is used as a counterion. To the contrary, as a dopant derived from lignin which is a forest carbon source, utilization of general sulfonated lignin as industrial lignin is disclosed (e.g. European Polymer Journal 37 (2001) 2217-2223, European Polymer Journal 38 (2002) 2213-2217.

DISCLOSURE OF THE INVENTION

However, constitutional elements of the aforementioned counterion have high environmental load biologically, and an organic dopant is a substance derived from a petroleum source which can not be recycled. Furthermore, sulfonated lignin not only has an ion, but also is hardly soluble or insoluble in a solvent.

Then, one object of the present invention is to provide a polyaniline dopant by which electrically conductive polyaniline having small environmental load and excellent in processability can be obtained. Another object of the present invention is to provide an electrically conductive polyaniline composition having small environmental load and excellent in processability, and a process for producing the same. Further, another object of the present invention is to provide an electrically conductive composite material excellent in electrical conductivity and a process for producing the same.

The present inventors mixed a solution of a phenol derivative of lignin which is derived from lignin with a phenol compound, with polyaniline, and obtained the finding that polynaniline is doped, and this exhibits electrical conductivity. In addition, the present inventors mixed a solution of a phenol derivative of lignin which is derived from lignin with a phenol compound, with polyaniline and obtained the finding that polyaniline is doped and this exhibits electrical conductivity. Furthermore, the present inventors obtained the finding that an excellent composite material is obtained by complexing a mixture of a phenol derivative of lignin and polyaniline, with a cellulose-based material.

The present invention is directed to an electrically conductive polyaniline composition, containing: polyaniline; and one or more kinds of lignin derivatives selected from the group consisting of the following lignin derivatives (a) to (e);

(a) a phenol derivative of lignin having a 1,1-bis(aryl) propane unit in which a carbon atom on an ortho-position and/or a para-position relative to a phenolic hydroxy group of a phenol compound is bound to a carbon atom on a C1 site of an aryl propane unit of lignin, (b) an acyl derivative having an acyl group in the lignin derivative (a), (c) a carbonyl derivative having a carboxyl group or a group derived from the carboxyl group in the lignin derivative (a), (d) a coumaran derivative in which an introduced phenol compound in the 1,1-bis(aryl)propane unit of the lignin derivative (a) is coumaranized, and (e) a crosslinking derivative having a crosslinking reacting group on an ortho-position and/or a para-position of a phenolic hydroxy group of a lignin derivative of (a).

In the electrically conductive polyaniline composition of the invention, the lignin derivative is preferably the lignin derivative (a). In the electrically conductive polyaniline composition, a phenolic hydroxyl group amount of the lignin derivative is preferably not less than 0.5 mol/nine carbons unit and not more than 2.0 mol/nine carbons unit. The lignin derivative preferably has a weight average molecular weight of not less than 500 and not more than 20000.

In the electrically conductive polyaniline composition of the invention, the phenol compound in the lignin derivative is preferably o-cresol and/or p-cresol. In the electrically conductive polyaniline composition of the invention, the lignin derivative is preferably a derivative obtained by solvating a lignin-containing material with the phenol compound, and adding an acid.

In the electrically conductive polyaniline composition of the invention, the lignin derivative is preferably contained at not less than 100 parts by weight and not more than 2000 by weight relative to 100 parts by weight of the polyaniline.

The present invention is also directed to a molded resin, containing any electrical conductive polyaniline composition described above. The molded resin of the invention is preferably a film-like body. The invention is also directed to an electrical conductive adhesive, including any electrical conductive polyaniline composition described above.

The present invention is further directed to a process for producing an electrically conductive polyaniline composition, including: a doping step of doping polyaniline using one or more kinds of lignin derivatives selected from the group consisting of the following lignin derivatives (a) to (e);

(a) a phenol derivative of lignin having a 1,1-bis(aryl) propane unit in which a carbon atom on an ortho-position and/or a para-position relative to a phenolic hydroxy group of a phenol compound is bound to a carbon atom on a C1 site of an aryl propane unit of lignin, (b) an acyl derivative having an acyl group in the lignin derivative (a), (c) a carbonyl derivative having a carboxyl group or a group derived from the carboxyl group in the lignin derivative (a), (d) a coumaran derivative in which an introduced phenol compound in the 1,1-bis(aryl)propane unit of the lignin derivative (a) is coumaranized, and (e) a crosslinking derivative having a crosslinking reacting group on an ortho-position and/or a para-position of a phenolic hydroxy group of the lignin derivative (a), and a collecting step of collecting fractions containing the doped polyaniline.

In the process of the invention, the doping step preferably mixes the lignin derivative and polyaniline in a solvent. The collecting step preferably collects solution fractions, dispersion fractions containing doped polyaniline, or aggregate fractions containing doped polyaniline. The present invention is also directed to an electrical conductive polyaniline composition obtained by the process described above.

The present invention is further directed to a polyaniline dopant, containing one or two or more kinds of lignin derivatives selected from the group consisting of the flowing lignin derivatives (a) to (e);

(a) a phenol derivative of lignin having a 1,1-bis(aryl) propane unit in which a carbon atom on an ortho-position and/or a para-position relative to a phenolic hydroxy group of a phenol compound is bound to a carbon atom on a C1 site of an aryl propane unit of lignin, (b) an acyl derivative having an acyl group in the lignin derivative (a), (c) a carbonyl derivative having a carboxyl group or a group derived from the carboxyl group in the lignin derivative (a), (d) a coumaran derivative in which an introduced phenol compound in the 1,1-bis(aryl)propane unit of the lignin derivative (a) is coumaranized, and (e) a crosslinking derivative having a crosslinking reacting group on an ortho-position and/or a para-position of a phenolic hydroxy group of the lignin derivative (a).

The present invention is further directed to an electrically conductive composite materiel, containing: polyaniline, one or more kinds of lignin derivatives selected from the group consisting of the following lignin derivatives (a) to (e);

(a) a phenol derivative of lignin having a 1,1-bis(aryl) propane unit in which a carbon atom on an ortho-position and/or a para-position relative to a phenolic hydroxy group of a phenol compound is bound to a carbon atom on a C1 site of an aryl propane unit of lignin, (b) an acyl derivative having an acyl group in the lignin derivative (a), (c) a carbonyl derivative having a carboxyl group or a group derived from the carboxyl group in the lignin derivative (a), (d) a coumaran derivative in which an introduced phenol compound in the 1,1-bis(aryl)propane unit of the lignin derivative (a) is coumaranized, and (e) a crosslinking derivative having a crosslinking reacting group on an ortho-position and/or a para-position of a phenolic hydroxy group of the lignin derivative (a), and a cellulose-based material.

In the electrically conductive composite materiel of the invention, the lignin derivative is preferably the lignin derivative (a). In the lignin derivative, a phenolic hydroxyl group amount is preferably not less than 0.5 mol/nine carbons unit and not more than 2.0 mol/nine carbons unit. The lignin derivative preferably has a weight average molecular weight of not less than 500 and not more than 20000. In the electrically conductive composite materiel of the invention, the phenol compound in the lignin derivative is preferably o-cresol and/or p-cresol. In the electrically conductive composite materiel of the invention, the lignin derivative is preferably a derivative obtained by solvating a lignin-containing material with the phenol compound, and adding an acid.

In the composite material of the invention, the cellulose-based material is preferably any of a cellulose-based fiber, an aggregate thereof, an interlacing body thereof and a dense body thereof. In the composite material of the invention, the cellulose-based material is preferably a sheet, or a molded material having a three-dimensional shape.

The present invention is still further directed to a process for producing an electrically conductive composite material, including: a complexing step of supplying, to a cellulose-based material, polyaniline doped with one or two or more kinds of lignin derivatives selected from the group consisting of the following lignin derivatives (a) to (e);

(a) a phenol derivative of lignin having a 1,1-bis(aryl) propane unit in which a carbon atom on an ortho-position and/or a para-position relative to a phenolic hydroxy group of a phenol compound is bound to a carbon atom on a C1 site of an aryl propane unit of lignin, (b) an acyl derivative having an acyl group in the lignin derivative (a), (c) a carbonyl derivative having a carboxyl group or a group derived from the carboxyl group in the lignin derivative (a), (d) a coumaran derivative in which an introduced phenol compound in the 1,1-bis(aryl)propane unit of the lignin derivative (a) is coumaranized, and (e) a crosslinking derivative having a crosslinking reacting group on an ortho-position and/or a para-position of a phenolic hydroxy group of the lignin derivative (a).

and retaining the material in the cellulose-based material.

In the process for producing an electrically conductive composite material of the invention, any of a solution, a dispersion and a paste of the doped polyaniline is preferably supplied to the cellulose-based material in the complexing step. And a powder of the doped polyaniline is preferably supplied to the cellulose-based material in the complexing step. In addition, a film of the doped polyaniline is preferably supplied to the cellulose-based material in the complexing step.

The process for producing an electrically conductive composite material of the invention, prior to the complexing step, preferably includes a doping step of mixing the lignin derivative and the polyaniline in a solvent and, in the complexing step, a fraction containing doped polyaniline is supplied to the cellulose-based material. In the process of the invention, doped polyaniline contained in an insoluble fraction of a mixed solution in the doping step is preferably supplied to the cellulose-based material. And doped polyaniline contained in an insoluble fraction and a solution fraction of a mixed solution in the doping step is preferably supplied to the cellulose-based material.

In the process for producing an electrically conductive composite material of the invention, the cellulose-based material is preferably any of a cellulose-based fiber, an aggregate thereof and an interlacing body thereof. In order to retain the doped polyaniline in the cellulose-based material in the complexing step, a solvent accompanied with the doped polyaniline is preferably distilled off, or heating is preferably performed to such a degree that any of polyaniline in the doped polyaniline or the lignin derivative is softened.

BEST MODE FOR CARRYING OUT THE INVENTION

Figure 1:
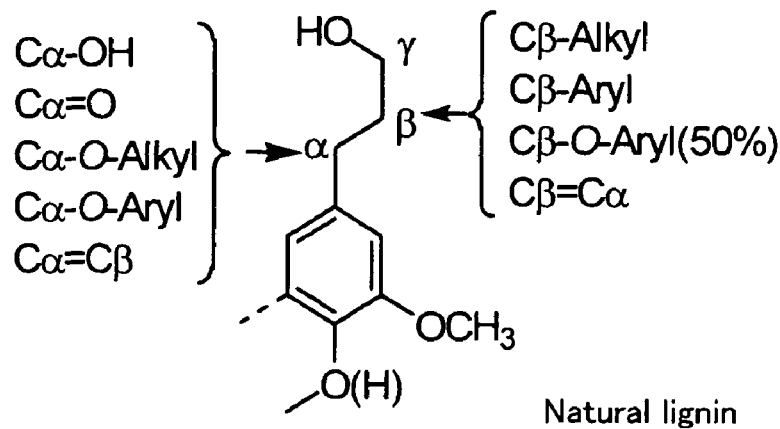
FIG. 1 is a view showing a process for producing a lignophenol derivative from lignin.
Figure 1:
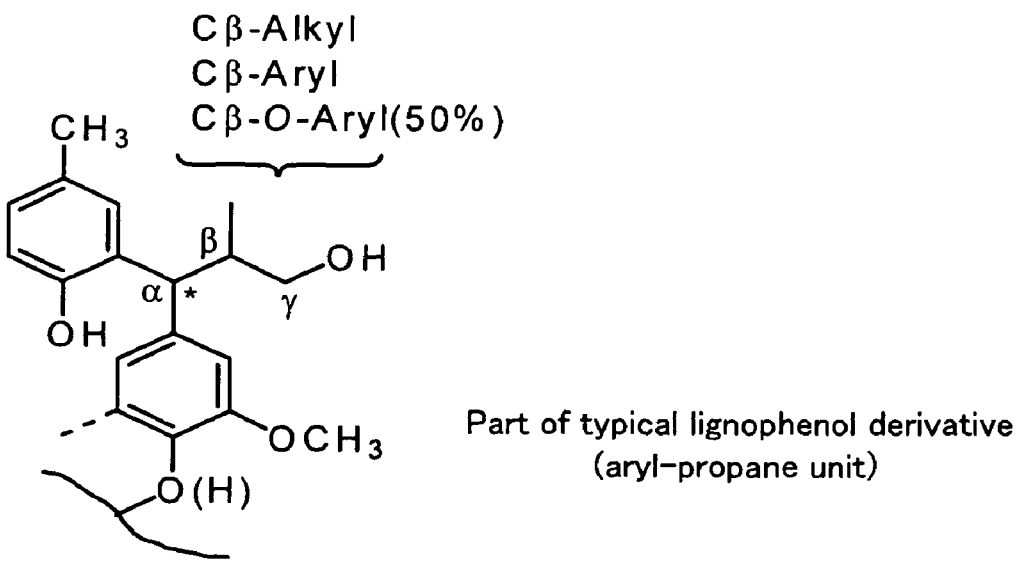

The polyaniline dopant of the present invention is a lignin derivative and is a phenol derivative of lignin (hereinafter, also referred to as a lignophenol derivative) having a 1,1-bis (aryl)propane unit in which a carbon atom on an ortho position and/or a para position relative to a phenolic hydroxyl group of a phenol compound is bound to a carbon atom of a C1 position of an aryl propane unit of lignin and, further, an acyl derivative, a carbonyl derivative, a coumaran derivative and a crosslinking derivative of this lignophenol derivative. The polyaniline electrically conductive composition of the present invention contains this lignine derivative dopant and polyaniline. The lignin derivative in the present invention merely has a phenolic hydroxyl group as a main functional group having acidity and, additionally, an alcoholic hydroxyl group and a methoxyl group, does not have a strong acid functional group such as a sulfonic acid group, and does not contain mainly a functional group having high acidity such as a carboxylic acid group. Irrespective of such the composition, ability to dope polyaniline therewith exceeds prediction by a person skilled in the art. Such the polyaniline dopant has not been found out up to now. Without intending that the present invention is theoretically restricted, the present inventors presume that a lignophenol derivative is rich in aromatic rings, and interaction with polyaniline due to a phenolic hydroxyl group having acidity improved by these aromatic rings contributes to doping of polyaniline.

According to the present invention, by using a lignophenol derivative having a 1,1-bis(aryl)propane unit, or a derivative thereof as a polyaniline dopant, a recycling-type or resource recycling-type organic dopant is provided. In addition, since a lignin derivative dopant has a structure of repetition of a monomer, and has the plastic-like properties, this imparts useful processability to electrical conductive polyaniline. In addition, a lignin derivative dopant dopes polyaniline and, at the same time, it functions as a binder, a forming material, or a light electrochemical reaction material due to properties which are original thereto. Thereby, wide application possibility can be imparted to an electrically conductive polyaniline composition.

In addition, in the composite material of the present invention, since polyaniline using a lignophenol derivative having a 1,1-bis(aryl)propane unit or a derivative thereof as a dopant, and a recycle-type or source recycling-type cellulose-based material are complexed, a recycling-type or resource recycling-type composite material is provided. Since a lignin derivative dopant has a structure of repetition of a monomer, and has the plastic-like properties, according to the present invention, a composite material excellent in processability is provided. In addition, since a cellulose-based material is a material having a high form freedom degree of a shape from a sheet-like body rich in flexibility to a firm laminate or a molded body, according to the present composite material, a composite material having a high form freedom degree is obtained. Furthermore, according to the present invention, since polyaniline doped with a lignin derivative together with a lignin derivative is strongly bound to a cellulose-based material, a composite material which is excellent in integrity and is hardly dedoped is provided.

The polaniline dopant of the present invention will be explained, and the electrically conductive polyaniline composition and a process for producing the same of the present invention will be explained below.

(Dopant)

The polyaniline dopant of the present invention is a lignophenol derivative and a secondary derivative thereof.

First, a lignophenol derivative will be explained. A lignophenol derivative is a derivative which is derived from lignin with a phenol compound, and is a compound having one or both of the following (a) and (b) units.

(a) A first 1,1-bis(aryl)propane unit (first unit) in which a carbon atom on an ortho position relative to a phenolic hydroxy group of a phenol compound is bound to a carbon atom at a C1 position of an aryl propane unit of lignin (b) A second 1,1-bis(aryl)propane unit in which a carbon atom on a para position relative to a phenolic hydroxy group of a phenol compound is bound to a carbon atom of a C1 position of aryl propane unit of lignin A lignophenol derivative may be provided with an aryl propane unit in which a phenol compound is not introduced, in addition to this. On the other hand, a lignophenol derivative has a hydroxy group as an acidic group, but is not provided with a sulfonic acid group. Similarly, a secondary derivative derived from a lignophenol derivative is not also provided with a sulfonic acid group. Therefore, a lignin derivative in the present invention is entirely different from sulfonated lignin in this point.

FIG. 1 shows a structure formed in a lignophenol derivative derived from a general lignocellulose-based material. A preferable production process for obtaining a lignophenol derivative will be explained below, and then chemical and physical properties will be explained.

A lignophenol derivative can be usually obtained by contacting a lignin-containing material compatibilized (solvated) with a predetermined phenol compound, preferably, a lignocellulose-based material with an acid. More general descriptions regarding a lignophenol derivative and a process for producing the derivative have been already described in JP-A No. 2-23701, JP-A No. 9-278904, and International Publication Nos. WO 99/14223, 2001-64494, 2001-261839, 2001-131201, and 2001-34233 (the contents of descriptions of these Patent Literatures are incorporated herein by reference in their entirety into this application).

A process for producing a lignophenol derivative is a process in which a lignocellulose-based material is solvated with a phenol compound in advance, or a phenol compound is sorbed on a lignocellulose-based material and, thereafter, this is solvated with a phenol compound, the lignocellulose-based material is contacted with an acid, thereby, the composite state of lignocellulose is alleviated and, at the same time, the phenol compound is selectively grafted at a C1 position (benzyl position) of an aryl propane unit of natural lignin to produce a lignophenol derivative and, at the same time, a lignocellulose-based material can be separated into cellulose and a lignophenol derivative. A lignophenol derivative is by itself a mixture of polymers derived from lignin obtained by reaction and separation from a lignin-containing material such as a lignocellulose-based material and, when the derivative is obtained from a lignin-contained material which is natural or nature-derived (natural lignin is processed), a molecular weight of an introduction phenol compound and an amount of a phenol compound to be introduced in the resulting polymer vary depending on a kind of lignin as a raw material in addition to reaction conditions.

(Lignocellulose-Based Material)

Examples of the "lignocellulose-based material" used in the present invention include a lignified material, various materials which are mainly a timber, for example, in addition to a wood flour and a chip, an agricultural waste and an industrial waste accompanying a timber source such as a waste material, a piece material, and a wastepaper. In addition, as a kind of a timber used, an arbitrary kind such as a needle-leaved tree and a broad-leaved tree can be used. Furthermore, various herbaceous plants, and related agricultural wastes and industrial wastes can be used. A process for producing a lignophenol derivative for a lignocellulose-based material can be applied to a general lignin-contained material.

(Phenol Compound)

As the phenol compound, a monovalent phenol compound, a divalent phenol compound, or a trivalent phenol compound can be used.

Examples of the monovalent phenol compound include phenol optionally having one or more substituents, naphthol optionally having one or more substituents, anthrol optionally having one or more substituents, and anthroquinoneol optionally having one or more substituents. Examples of the divalent phenol compound include catechol optionally having one or more substituents, resorcinol optionally having one or more substituents, and hydroquinone optionally having one or more substituents. Examples of the trivalent phenol compound include pyrogallol optionally having one or more substituents.

In the present invention, among the monovalent phenol compound, the divalent phenol compound and the trivalent phenol compound, one or two or more kinds may be used and, preferably, monovalent phenol is used. A kind of a substituent which may be possessed by monovalent to trivalent phenol compounds is not particularly limited, but an arbitrary substituent may be possessed. Preferably, the substituent is a group other than an electron withdrawing group (e.g. halogen atom), for example, a lower alkyl group-containing substituent of a carbon number of 1 to 4, preferably a carbon number of 1 to 3. Examples of the lower alkyl group-containing substituent include a lower alkyl group (methyl group, ethyl group, propyl group etc.), and a lower alkoxy group (methoxy group, ethoxy group, propoxy group etc.). Alternatively, an aromatic substituent such as an aryl group (phenyl group etc.) may be possessed. Alternatively, a hydroxy group-containing substituent may be possessed.

By binding these phenol compounds to carbon at a C1 position of an aryl propane unit of lignin in a carbon atom on an ortho position or a para position relative to a phenolic hydroxy group, a 1,1-bis(aryl)propane unit is formed. Therefore, in order to maintain at least one introduction site, it is preferable that a substituent is not possessed on at least one position among an ortho position and a para position. A unit formed by binding an ortho-positional carbon atom of a phenolic hydroxy group of a phenol compound to the C1 position is referred to as an ortho-position binding unit, and a unit formed by binding a para-positional carbon atom of a phenolic hydroxy group of a phenol compound to the C1 position is referred to as a para-position binding unit.

From the forgoing, in the present invention, in addition to an unsubstituted phenol derivative, one or two or more kinds of phenol derivatives in various substitution forms having at least one unsubstituted ortho-position or para-position can be appropriately selected and used. An ortho-position binding unit and a para-position binding unit exhibit, for example, different functions in an alkali treatment process described later. An ortho-position binding unit allows a phenolic hydroxy group in a phenol compound which has been introduced by mild alkali treatment to be lost, produces an aryl coumaran structure in the unit, and a molecular form varies accompanied with aryl group transfer by strong alkali treatment. In any event, an ortho-position binding unit contributes to efficient degradation to the lower-molecule lignophenol derivative due to alkali treatment.

On the other hand, a para-position binding unit does not generate an aryl coumaran structure in a lignin derivative and variation in a molecular form thereafter by alkali treatment, and does not contribute to degradation to the lower-molecular weight in the unit site. Therefore, it can be said that the unit has the function of imparting alkali resistance. In addition, by selecting a kind of a phenol compound to be used in a lignophenol derivative, frequency of introduction of a crosslinking functional group into the resulting lignophenol derivative at a secondary derivatizing step at a later stage can be regulated and, as a result, crosslinking reactivity of a crosslinking body (prepolymer) can be controlled.

As described later, a crosslinking group introducing site is ortho and para positions relative to a phenolic hydroxy group. In addition, a site for introducing an introduction phenol compound into a phenylpropane unit of lignin is an ortho position or a para position relative to a phenolic hydroxy group. Therefore, by an aspect of introducing a substituent into an ortho position and a para position (maximally, 3 sites) relative to a phenolic hydroxy group in an introduction phenol compound, a site for introducing a crosslinking functional group into an introduction phenol compound and an amount of introduction are controlled and, as a result, an amount of introduction into a lignin matrix site can be also controlled.

Like this, by introduction into lignin by combining one or two or more kinds of a phenol compound having a crosslinking group introducing site having different reactivity, and a phenol compound having no introduction site or having a different introduction site, a site and the number of introduction sites of a crosslinking group can be controlled at introduction of a crosslinking group thereafter, as a result, a crosslinking density of a crosslinked body obtained by crosslinking a crosslinking body can be also controlled.

In addition, in order to obtain a lignophenol derivative having a first unit, a phenol compound having no substituent on at least one ortho-position (preferably all ortho positions) is used. In addition, a phenol compound having no substituent on at least one ortho-position (2-position or 6-position) and having a substituent on a para-position (4-position) (typically, 2,4-substituted monovalent phenol derivative) is preferable. Most preferable is a phenol compound having no substituent on all ortho positions, and having a substituent on a para-position (typically, a 4-substituted monovalent phenol compound). One or two or more kinds of a 4-substituted phenol compound and a 2,4-substituted phenol compound can be used by combining them.

In order to obtain a lignophenol derivative having a second unit, a phenol compound having no substituent on a para-position (typically, 2 (6)-substituted monovalent phenol compound) is preferable. More preferably, at the same time, a phenol compound having a substituent on an ortho-position (preferably all ortho position) (typically, 2,6-substituted monovalent phenol compound) is used. That is, it is preferable to use one or two or more kinds of a 2 (or 6-positional) substituted phenol compound and 2,6-substituted phenol by combining them.

Preferable examples of the phenol derivative include o-cresol, p-cresol, 2,6-dimethylphenol, 2,4-dimethylphenol, 2-methoxyphenol (Guaiacol), 2,6-dimethoxyphenol, catechol, resorcinol, homocatechol, pyrogallol and fluoroglucinol. By using p-cresol, a high introducing efficacy can be obtained.

In addition, by selecting a kind of a phenol compound used in the present process, properties of the resulting lignophenol derivative can be controlled and, consequently, properties of an electrically conductive polyaniline composition using this as a dopant can be controlled. For example, by selecting a kind of a phenol compound, an amount of introduction of a phenol compound, and a hydroxy equivalent can be adjusted. By adjusting these, since a crosslinked site when the present composition is cured using a suitable crosslinking agent is a hydroxy group site, a crosslinking site, a crosslinking density and the like can be adjusted. In addition, since a crosslinked structure when crosslinked using a crosslinking body of a lignophenol derivative is different depending on an amount and a position of a phenolic hydroxy group, a crosslinked structure can be adjusted by a kind and an introduction amount of a phenol compound. In addition, an introduction frequency of a phenol compound varies depending on the presence or the absence, a position, a size and the like of a substituent of a phenol compound to be introduced. Therefore, an introduction frequency can be regulated. Particularly, an introduction frequency can be easily regulated by steric hindrance due to a size of a substituent. Where one controls an introduction position utilizing a substituent, when a lower alkyl group is utilized as a substituent, an introduction frequency can be easily regulated by a carbon number and a branched form. When a substituent is a methyl group, an introduction frequency can be maintained high, and an introduction position can be controlled.

In addition, by selecting a combination of phenol compounds so that first units are contained at a large number or predominantly in a lignophenol derivative, recycling property of the finally obtained electrically conductive polyaniline composition can be enhanced, because when an alkali is acted on a lignophenol derivative having a first unit, due to the presence of a hydroxy group on an ortho-position of a phenol compound introduced into a 1,1-bis(aryl)propane unit, the unit forms an aryl-coumaran-like unit, and this is separated from a lignophenol derivative on a C3 position thereof.

By selecting a phenol compound so that second units are contained at a large number or predominantly in a lignophenol derivative, an electrically conductive polyaniline composition with improved alkali resistance can be obtained, because even when an alkali is acted on a second unit, the unit does not form a coumaran-like unit, and a bond with other unit adjacent at the site is not cut.

(Acid)

In the present process, an acid to be added to a lignin-containing material is not particularly limited, but it is preferable that an acid has the activity of swelling cellulose. Examples include 65% by weight or more sulfuric acid (preferably, 72% by weight sulfuric acid), 85% by weight or more phosphoric acid, 38% by weight or more hydrochloric acid, p-toluenesulfonic acid, trifluoroacetic acid, trichloroacetic acid, and formic acid. As a preferable acid, there are 65% by weight or more (more preferably 72% by weight or more) sulfuric acid, 85% by weight or more (more preferably 95% by weight or more) phosphoric acid, trifluoroacetic acid, or formic acid.

Examples of a method of converting lignin in a lignin-containing material into a lignophenol derivative, and separating this are not limited to, but include the following three methods.

A first method is the method described in JP-A No. 2-233701. In this method, a liquid phenol compound is permeated into a lignocellulose-based material such as wood flour to solvate lignin with a phenol compound, then, a concentrated acid (explained above, e.g. 72% sulfuric acid) is added to a lignocellulose-based material, and these are mixed to dissolve a cellulose component. According to this method, a phenol compound with which lignin has been solvated, and a concentrated acid in which a cellulose component is dissolved, form a 2-phase separated system. Lignin solvated with a phenol compound is contacted with an acid only at an interface where a phenol compound phase is contacted with a concentrated acid phase, generating a reaction. That is, a cation on a side chain C1-position (benzyl-position) which is a highly reacting site of a lignin fundamental structural unit generated by interface contact with an acid is attacked by a phenol compound. As a result, a phenol compound is introduced into the C1-position with a C—C binding and, by cleavage of a benzyl aryl ether bond, a compound is converted into a lower-molecular compound. Thereby, a lignophenol derivative in which lignin is converted into a lower-molecular compound and, at the same time, a phenol compound is introduced into a C1-position of the fundamental structural unit is generated in a phenol compound phase. From this phenol compound phase, a lignophenol derivative is extracted. A lignophenol derivative is obtained as an aggregate of lower-molecular lignins which have been fragmented into lower-molecular compounds by cleavage of a benzyl aryl ether bond in lignin. In addition, it is known that as an aspect of introducing a phenol compound into a benzyl-position, there is introduction via a phenolic hydroxy group thereof.

In addition, extraction of a lignophenol derivative from a phenol compound phase can be performed, for example, by the following method. That is, a phenol compound phase is added to large excessive of ethyl ether, and resulting precipitates are collected, and dissolved in acetone. An acetone insoluble part is removed by centrifugation to concentrate an acetone soluble part. This acetone soluble part is added dropwise to large excessive of ethyl ether, and precipitation sections are collected. A solvent is distilled off from this precipitation section to obtain a primary derivative. A crude primary derivative is obtained by simply removing an acetone soluble part by evaporation under reduced pressure.

In second and third methods, a solvent (e.g. ethanol or acetone) in which a solid or liquid phenol compound has been dissolved is permeated into a lignocellulose-based material, and a solvent is distilled off (a step of sorbing a phenol compound). Then, a concentrated acid is added to this lignocellulose-based material to dissolve cellulose components. As a result, as in a first method, in lignin solvated with a phenol compound, a cation at a highly reacting site (side chain C1-position) of lignin generated by contact with a concentrated acid is attacked by a phenol compound, to introduce a phenol compound. In addition, a benzyl aryl ether bond is cleaved to convert lignin into a lower-molecular compound. Properties of the resulting primary derivative are the same as those obtained by the first method. And, according to the same manner as that of the first method, a lignophenol derivative with a phenol compound introduced therein is extracted with a liquid. Extraction of a primary derivative from a liquid phenol compound phase can be performed as in the first method (this is referred to as second method). Alternatively, the total reaction solution after treatment with a concentrated acid is placed into excessive of water, insoluble sections are collected by centrifugation, and these are deacidified, and dried. To this dried product is added acetone or alcohol, to extract a lignophenol derivative. Further, this soluble section is added dropwise to excessive of ethyl ether as in the first method to obtain a primary derivative as an insoluble section (this is referred to as third method). As described above, an embodiment of a process for producing a lignophenol derivative has been explained, but the process is not limited to this, and the derivative may be also produced by a method with appropriate improvement to it.

A production process and an origin of a lignophenol derivative and a secondary derivative thereof used in the present dopant are not particularly limited, but those derivatives may be derived from a needle-leaved tree or a broad-leaved tree, preferably derived from a needle-leaved tree in some cases.

Like this, a lignophenol derivative having a first and/or second unit can be obtained in which a C1-position of an aryl propane unit of lignin is grafted with a phenol compound used on an ortho position or a para position of the phenol compound.

A lignophenol derivative obtained from a lignin-containing material is provided with a first and/or second unit as described above, and can have the following nature. However, this is not intended that a lignophenol derivative in the present invention is limited to derivatives having the following nature.

(1) A weight average molecular weight is about 2000 to about 20000. A weight average molecular weight can be measured by a column chromatography method in terms of polystyrene.
(2) The derivative has little conjugation system in a molecule, and a tone thereof is extremely pale. Typically, it is a pale pink-based white powder.
(3) The derivative is derived from a needle-leaved tree, and has a solid-liquid phase transition point of about 150° C. to 180° C., or is derived from a broad-leaved tree and has a solid-liquid phase transition point of about 130° C. to 160° C.
(4) The derivative is easily dissolved in methanol, ethanol, acetone, dioxane, pyridine, tetrahydrofuran, dimethylformamide, N-methyl-2-pyrrolidone, dimethylformamide, dimethyl sulfoxide, or an alkali. When 20 g of a lignophenol derivative is added to 1000 ml of each of these organic solvents, and they are mixed for 30 minutes, a transparent liquid is obtained. In addition, when 50 g of a lignophenol derivative is added to an aqueous alkali solution (1.0 N, e.g. NaOH), and these are mixed for 30 minutes, a transparent liquid is obtained.
(5) A hydroxy group value is not lower than 50 and not higher than 200.
(6) A phenol introduction amount is not less than 0.5 mol/nine carbons unit to not more than 1.0 mol/nine carbons unit.
(7) A phenolic hydroxy group amount is not less than 0.5 mol/nine carbons unit to not more than 2.0 mol/nine carbons unit.
(8) An aliphatic hydroxy group amount is not less than 0.5 mol/nine carbons unit to not more than 1.5 mol/nine carbons unit.
(9) The derivative has wide broad absorption at 800 to 400 nm of solid ultraviolet/visible spectroscopy, and has an absorption peak at around 480 to 400 nm.

(Secondary Derivative)

In addition, a lignin derivative used in the present invention includes a secondary derivative obtained by chemically modifying this lignophenol derivative. A secondary derivative is an acyl derivative, a carbonyl derivative, a crosslinking derivative and a coumaran derivative of a lignophenol derivative. In addition, in these secondary derivatives, it is preferable that derivatization is performed in such a range that the function as a polyaniline dopant is not deteriorated, and it is preferable that a phenolic hydroxy group in a 1,1-bis(aryl) propane unit is maintained. In addition, where a lignophenol derivative is used as a polyaniline dopant, when these secondary derivatives are used jointly, a phenolic hydroxy group of a 1,1-bis(aryl)propane unit may not be maintained in some cases.

The acyl derivative has an acyl group on a lignophenol derivative. The acryl derivative is a derivative having an acyl group in place of a hydrogen atom of at least a part of phenolic hydroxy groups of a lignophenol derivative. An acyl group (RCO—) is introduced in place of a hydrogen atom of a phenolic hydroxy group and, as a result, the acyl derivative is obtained by an acyl group introducing reaction in which an —O—COR group is formed on an aromatic ring thereof. The acyl group is not particularly limited to, but includes an acetyl group, a propionyl group, a butyryl group, a valeryl group, a benzoyl group, toluoyl group and the like, and is preferably an acetyl group. This acyl group introducing reaction can be performed by appropriately applying general acyl group introducing reaction condition to a lignophenol derivative. For example, by a reaction with an acylating agent such as acetic anhydride, an acyl group may be introduced into a hydroxy group, or an acyl group may be introduced by using carboxylic acid monohalide such as acetyl chloride. Since an acyl derivative having an acyl group also leads to protection of a hydroxy group, and an amount of a phenolic hydroxy group can be reduced, thereby, doping property different from doping property possessed by a lignophenol derivative may be possessed. At the same time, processability as an electrically conductive polyaniline composition can be changed. Alternatively, by using this derivative in combination with a lignophenol derivative, doping property of a lignophenol derivative can be adjusted. From the forgoing, the acyl derivative may be provided with an acylated unit in which an acyl group has been introduced into a phenolic hydroxy group of a 1,1-bis(aryl)propane unit in a lignophenol derivative and, in addition to this acylated unit, at least a part of 1,1-bis(aryl) propane units present in a lignophenol derivative can be maintained.

The carbonyl derivative is a lignophenol derivative having a carboxyl group or a group derived therefrom. That is, the carbonyl derivative is a derivative having a carboxyl group or a group derived from the carboxyl group in place of a hydrogen atom of at least a part of phenolic hydroxy groups of a lignophenol derivative via a —CO— bond. Such the carbonyl derivative having a carboxyl group is obtained by acylating a phenolic hydroxy group using carboxylic acid di (or more) halide such as carboxylic acid dichloride and, as a result, the other carboxyl group of the carboxylic acid dihalide is introduced. For example, carboxylic acid dichloride such as adipic acid dichloride, maleic acid dichloride, and terephthalic acid dichloride can be used. A reaction of esterifying these acid halides is well-known to a person skilled in the art, and can be performed by appropriately applying general reaction conditions to a lignophenol derivative. Since by the carbonyl derivative having a carboxyl group, a carboxyl group is possessed in place of a phenolic hydroxy group, whereby, doping property different from doping property possessed by a lignophenol derivative can be possessed. In addition, by using this derivative in combination with a lignophenol derivative, doping property of a lignophenol derivative can be adjusted.

In addition, the carbonyl derivative includes a derivative having a group derived from the carboxyl group. Herein, examples of the group derived from a carboxyl group include an amido group (—CONHR), an ester group (—COOR) and the like. Examples of R of an amido group and an ester group include a lower straight or branched alkyl group of a carbon number of around 1 to 5, and a cycloalkyl group, an alkylaryl group, and an aralkyl group of a carbon number of around 6 to 9, optionally having a substituent. A reaction of introducing an amido group is performed on a double bond in a lignophenol derivative or a carboxyl group after the aforementioned carboxyl group introducing reaction. In an amido group introducing reaction and an ester group introducing reaction, the previously known various reagents and conditions can be used by appropriately selecting them. By the carbonyl derivative having an amido group or the like, when an amido group is possessed, thereby, doping property different from doping property possessed by a lignophenol derivative can be possessed. In addition, by using this derivative in combination with a lignophenol derivative, doping property of a lignophenol derivative can be adjusted.

From the forgoing, the carbonyl derivative may be provided with a carbonized unit in which a carbonyl group or a group derived therefrom is introduced into a phenolic hydroxy group of a 1,1-bis(aryl)propane unit in a lignophenol derivative and, in addition to this carbonized unit, at least a part of 1,1-bis(aryl)propane units present in a lignophenol derivative can be maintained.

The crosslinking derivative is a derivative having a crosslinking reacting group on an ortho-position and/or a para-position of a phenolic hydroxy group of a lignophenol derivative. A reaction of introducing a crosslinking group can be performed, for example, by reacting a lignophenol derivative with a crosslinking group forming compound under alkali condition, to introduce a crosslinking group into an ortho-position and/or a para-position of a phenolic hydroxy group in a lignophenol derivative. That is, the present derivative is obtained by mixing a lignophenol derivative with a crosslinking group forming compound to react them, under the state that a phenolic hydroxy group of a lignophenol derivative used can be dissociated. The state where a phenolic hydroxy group of a lignophenol derivative can be dissociated is usually formed in an appropriate alkali solution. A kind, a concentration and a solvent of an alkali used are not particularly limited as far as a phenolic hydroxy group of a lignophenol derivative is dissociated. For example, a 0.1 N aqueous sodium hydroxide solution can be used.

Under such the conditions, since a crosslinking group is introduced into an ortho-position or a para-position of a phenolic hydroxy group, an introduction position of a crosslinking group is approximately determined depending on a kind and a combination of phenolic compounds used. That is, when an ortho-position and a para-position are di-substituted, a crosslinking group is not introduced into an introduction phenol nucleus, and is introduced into a phenolic aromatic nucleus on a lignin matrix side. Since a phenolic aromatic nucleus on a lignin matrix side is mainly present at a polymer end of a lignophenol derivative, a prepolymer in which a crosslinking group is mainly introduced at a polymer end is obtained. In addition, when an ortho-position and a para-position are mono-substituted or not substituted, a crosslinking group is introduced into an introduction phenol nucleus and a phenolic aromatic nucleus of a lignin matrix. Therefore, a crosslinking group is introduced over a length of a polymer chain in addition to an end of a polymer chain, and a polyfunctional prepolymer is obtained. In addition, by introduction of a crosslinking group into an introduction phenol nucleus, a 1,1-bis(aryl)propane unit comes to have a crosslinking group (such the unit is referred to as crosslinking unit).

A kind of a crosslinking group to be introduced into a lignophenol derivative is not particularly limited. A crosslinking group which can be introduced into an aromatic nucleus on a lignin matrix side, or an aromatic nucleus of an introduction phenol compound may be used. Examples of a crosslinking group include a hydroxymethyl group, a hydroxyethyl group, a hydroxypropyl group, a 1-hydroxyvaleraldehyde group and the like. The crosslinking group forming compound is an electrophilic compound, which forms or retains a crosslinking group after binding. Examples include formaldehyde, acetoaldehyde, propionaldehyde, and glutaraldehyde. In view of an introduction efficiency, it is preferable to use formaldehyde.

Upon a reaction of a lignophenol derivative and a crosslinking group forming compound, in view of effective introduction of a crosslinking group, it is preferable to add a crosslinking group forming compound at 1 mole-fold or more of an aromatic nucleus and/or an introduction phenol nucleus of an aryl propane unit of lignin in a lignophenol derivative. The compound is added more preferably at 10 mole-fold or more, further preferably 20 mole-fold or more.

Then, in the state where a lignophenol derivative and a crosslinking group forming compound are present in an alkali solution, if necessary, by heating this solution, a crosslinking group is introduced into a phenol nucleus. The heating condition is not particularly limited as far as a crosslinking group is introduced, and 40 to 100° C. is preferable. When a temperature is lower than 40° C., a reaction rate of a crosslinking group forming compound is very low, being not preferable. When a temperature is higher than 100° C., a side reaction other than introduction of a crosslinking group into lignin such as a reaction of a crosslinking group forming compound itself is activated, being not preferable. 50 to 80° C. is more preferable and, for example, about 60° C. is particularly preferable. A reaction is stopped by cooling a reaction solution, the reaction solution is acidified (around pH 2) with hydrochloric acid or the like having an appropriate concentration, and an acid, and an unreacted crosslinking group forming compound are removed by washing or dialysis. After dialysis, a sample is recovered by lyophilization. If necessary, a sample is dried under reduced pressure over diphosphorus pentaoxide.

The thus obtained crosslinking secondary derivative has a crosslinking group on an ortho-position and/or a para-position relative to a phenolic hydroxy group in a lignophenol derivative. An introduction amount of a crosslinking group is usually around 0.01 to 1.5 mole/C9 unit in many cases. Since a crosslinking derivative has a crosslinking group together with a phenolic hydroxy group, it can be crosslinked upon processing of an electrically conductive polyaniline composition and this can improve processability.

From the forgoing, the crosslinking derivative can be provided with a crosslinking unit in which a crosslinking group has been introduced into a phenolic hydroxy group of a 1,1-bis(aryl)propane unit in a lignophenol derivative, and at least a part of 1,1-bis(aryl)propane units present in a lignophenol derivative in addition to this crosslinking unit can be maintained.

(Coumaran Derivative)

A coumaran derivative is a derivative in which an introduction phenol compound of a bis(aryl)propane unit of a lignophenol derivative is coumaranized (this is referred to as aryl coumaran unit). Such the derivative can be obtained by contacting a lignophenol derivative with an alkali. Preferably, materials are heated. For example, in a lignophenol derivative having a first unit in which an ortho-position of a phenolic hydroxy group of an introduced phenol compound has been introduced into a C1-position, by alkali treatment, attack of a C2-positional carbon with a phenoxide ion of an introduced phenol compound occurs. That is, for example, in mild alkali treatment, the phenolic hydroxy group of the introduced phenol compound is dissociated, the resulting phenoxide ion attacks a C2-position constituting a C2 aryl ether bond in an intramolecular nucleophilic reaction manner to cleave a C2 aryl ether bond, and an introduced phenol nucleus forms a coumaran skeleton with a part of phenylpropane units in which it is introduced therein. At the same time, by this intramolecular nucleophilic reaction, a lignophenol derivative is fragmented into lower-molecular compounds and, by cleavage of a C2 aryl ether bond, a phenolic hydroxy group is generated in an adjacent matrix nucleus of lignin which has been bound with the ether bond. As a result, since a phenolic hydroxy group on an introduced phenol compound side disappears, while a phenolic hydroxy group is manifested on a lignin matrix nucleus side, this results in transference of a phenolic hydroxy group from an introduced phenol compound to a lignin matrix nucleus side. By a carbonyl derivative having a carboxyl group, since a carboxyl group is possessed in place of a phenolic hydroxy group, thereby, doping property different from doping property possessed by a lignophenol derivative may be possessed. In addition, by using this derivative in combination with a lignophenol derivative, doping property of a lignophenol derivative can be adjusted. A coumaran derivative obtained by alkali treatment does not change an amount of a phenolic hydroxy group, but by movement of the position and manifestation of a coumaran skeleton, change in doping property is expected.

The alkali treatment is specifically performed by dissolving a lignophenol derivative in an alkali solution to react them for a constant time and, if necessary, heating this. As an alkali solution which can be used in this treatment, any alkali can be used as far as it can dissociate a phenolic hydroxy group of an introduced phenol compound in a lignophenol derivative, and a kind and a concentration of an alkali, and a kind of a solvent are not particularly limited. This is because when dissociation of the phenolic hydroxy group occurs under alkali, a coumaran structure is formed by the adjacent group associating effect. For example, in a lignophenol derivative with p-cresol introduced therein, a sodium hydroxide solution can be used. For example, a range of an alkali concentration of an alkali solution can be 0.5 to 2 N, and a treating time can be around 1 to 5 hours. In addition, a lignophenol derivative in an alkali solution easily manifests a coumaran structure by heating. Conditions such as a temperature, a pressure and the like upon heating can be set without any limitation. For example, by heating an alkali solution to 100° C. or higher (e.g. around 140° C.), conversion of a lignophenol derivative into a lower-molecular compound can be attained. Further, an alkali solution may be heated to a boiling point or higher under pressure to convert a crosslinked lignophenol derivative into a lower-molecular compound.

In addition, it is known that at the same concentration of the same alkali solution, in a range of a heating temperature of 120° C. to 140° C., as a heating temperature is higher, conversion into a lower-molecular composition due to cleavage of a C2-aryl ether bond is promoted. In addition, it is known that in the temperature range, as a heating temperature is higher, a phenolic hydroxy group derived from an aromatic nucleus derived from a lignin matrix is increased, and a phenolic hydroxy group derived from an introduced phenol compound is decreased. Therefore, a degree of conversion into a lower-molecular compound, and a degree of conversion from a side of a C1-position introduced phenol compound of a phenolic hydroxy group site to a phenol nucleus of a lignin matrix can be adjusted by a reaction temperature. That is, in order to obtain an aryl coumaran body in which conversion into a lower-molecular compound has been promoted, or more phenolic hydroxy group sites are converted from a C1-position introduced phenol compound side to a lignin matrix, a reaction temperature of around 80 to 140° C. is preferable.

Cleavage of a C2-aryl ether due to adjacent group association of a C1 phenol nucleus in an ortho-position binding unit is accompanied with formation of an arylcoumaran structure as described above, but it is not necessarily required that conversion of a lignophenol derivative into a lower-molecular compound is performed under condition (around 140° C.) that aryl coumaran is effectively produced, and the conversion may be performed at a higher temperature (e.g. around 170° C.) depending on a material and the purpose. In this case, a once produced coumaran-ring is cleaved, a phenolic hydroxy group is reproduced on an introduced phenol compound side and, further, by new manifestation of a conjugation system due to molecular form variation accompanied with aryl group transfer, doping property different from that of a lignophenol derivative or a secondary derivative having the aforementioned aryl coumaran structure can be manifested.

From the forgoing, a heating temperature in alkali treatment is not particularly limited, but if necessary, treatment can be performed at not lower than 80° C. and not higher than 200° C. When a temperature is greatly below 80° C., a reaction does not sufficiently progress and, when a temperature greatly exceeds 200° C., unfavorable side reaction is easily caused together.

One preferable example of formation of a coumaran structure and treatment for accompanying conversion into a lower-molecular compound includes the condition of 140° C. and a heating time of 60 minutes in an autoclave using a 0.5 N aqueous sodium hydroxide solution as an alkali solution. Particularly, this treating condition is preferably used in a lignophenol derivative which has been derivatized with p-cresol or 2,4-dimethylphenol. In addition, one example of alkali treatment accompanying manifestation of a new conjugation system includes the condition of 170° C. and a heating time of 20 minutes to 60 minutes in an autoclave using a 0.5 N aqueous sodium hydroxide solution as an alkali solution.

From the forgoing, a coumaran derivative can be provided with an aryl coumaran unit derived from a 1,1-bis(aryl)propane unit in a lignophenol derivative, and at least a part of 1,1-bis(aryl)propane units present in a lignophenol derivative in addition to bisarylcoumaran unit can be maintained.

These secondary derivatives are used in combination with a lignophenol derivative in such a range that polyaniline dopant property possessed by a lignophenol derivative is not deteriorated. Additionally, when these secondary derivatives are used alone, various functional groups are introduced in such a range that polyaniline dopant property possessed by a lignophenol derivative is not deteriorated.

It is preferable that a weight average molecular weight of a lignin derivative containing these lignophenol derivatives and a secondary derivative thereof is not less than 2000. When a weight average molecular weight is less than 2000, the effect of imparting electrical productivity to polyaniline as a polymer blend is not sufficient. Preferably, the molecular weight is not less than 4000. In addition, it is preferable that a weight average molecular weight is not more than 20000. When a molecular weight exceeds 20000, there is a tendency that a site for introduction of a phenol compound becomes ununiform. More preferably, the molecular weight is not more than 15000. A weight average molecular weight is a weight average molecular weight in terms of polystyrene obtained using gel permeation chromatography and employing polystyrene as a standard.

In addition, it is preferable that a phenol introduction amount is not less than 0.5 mol/nine carbons unit, preferably not less than 0.6 mol/nine carbons unit. A phenol introduction amount is calculated based on the number of protons using 1H-proton NMR. It is preferable that a phenolic hydroxy group amount is not less than 0.5 mol/nine carbons unit. A phenolic hydroxy group amount is calculated based on the number of protons using 1H-proton NMR.

According to the present dopant, polyaniline can be doped although a functional group having high acidity such as a sulfonic acid group is not possessed. In addition, according to the present dopant, the dopant is outcome from a recyclable forest source, and does not contain a harmful or not biodegradable component. For this reason, the dopant is a dopant suitable for recycling or resource circulation, which has previously been not found out. Further, the present dopant can dope polyaniline in the state where it is mixed with polyaniline, and can impart useful processability to polyaniline by mixing. Furthermore, since in any of the solution state and the melt state, a polyaniline can be doped, an optimal doping procedure can be selected depending on the necessity.

(Electrically Conductive Polyaniline Composition)

The electrically conductive polyaniline composition of the present invention contains the dopant and polyaniline or a derivative thereof.

(Polyaniline and Derivative Thereof)

The dopant of the present invention is preferable for doping polyaniline, and an electrically conductive polyaniline composition equipped with better electrical conductivity can be obtained.

Figure 2:
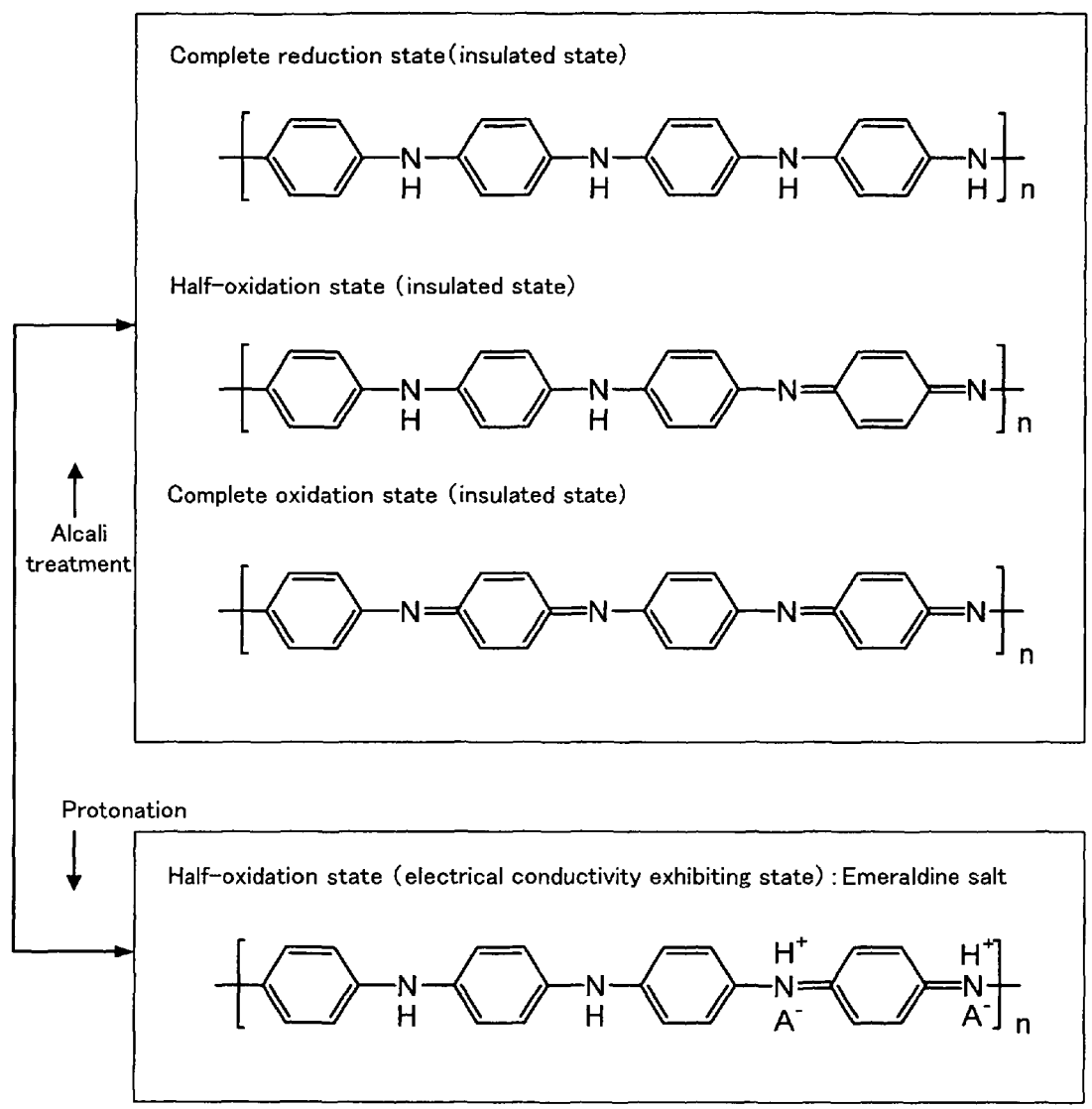
FIG. 2 is a view showing structures of polyaniline in the insulated state and the electrical conductivity exhibiting state.

In an electrically conductive polyaniline composition, polyaniline or a derivative thereof (hereinafter, simply referred to as polyaniline) is used. In order to prepare a composition having high electrical conductivity, preferably, polyaniline which can manifest high electrical conductivity is used. As such the polyaniline, a radical cation-based substance of polyaniline (Emeraldine) is preferably used. Herein, an Emeraldine-type polyaniline contains, as a repetition unit, a fundamental skeleton in which a reducing-type unit (phenylenediamine skeleton) and an oxidation-type unit (quinoneimine skeleton) are present at a mole ratio of 1:1, for example, shown in FIG. 2.

According to the dopant of the present invention, since it alone can dope polyaniline to impart electrically conductivity, polyaniline in the dedoped state (Emeraldine base) can be used as a composition component. However, polyaniline (Emeraldine salt) doped with other dopant may be used. Polyaniline in the doped state can be obtained by doping polyaniline in the dedoped state with a protonic acid. As protonic acid used thereupon, protonic acid which has previously been used can be used similarly, and an inorganic acid such as hydrochloric acid, sulfuric acid, nitric acid, borohydrofluoric acid, perchloric acid, amidosulfuric acid and the like; an organic acid such as benzenesulfonic acid, p-toluenesulfonic acid, m-nitrobenzoic acid, trichloroacetic acid, acetic acid, propionic acid and the like; a polymer acid such as polystyrenesulfonic acid, polyvinylsulfonic acid, polyvinylsulfuric acid and the like can be used, being not limited to them. These protonic acids may be used alone, or may be used in a form of a mixture of two or more kinds.

According to the present invention, polyaniline may be polyaniline obtained by the known any process, or commercially available polyaniline may be used as it is.

In the present specification, the "derivative of polyaniline" refers to an aromatic ring of aniline to which a substituent such as an alkyl group of a carbon number of 1 to 20, an alkoxy group of a carbon number of 1 to 20, a thioalkyl group of a carbon number of 1 to 20, a carboxyester group of a carbon number of 1 to 20, and a cyano group, or a halogen atom such as a fluorine atom, a chlorine atom, a bromine atom, and an iodine atom is added. More specifically, in the present invention, a derivative of polyaniline can be obtained by using o-, or m-substituted aniline in place of aniline in the aforementioned process. In the aforementioned aspect, examples of the o-, or m-substituted aniline include o-toluidine, m-toluidine, o-ethylaniline, m-ethylaniline, o-ethoxyaniline, m-butylaniline, m-hexylaniline, m-octylaniline, 2,3-dimethylaniline, 2,5-dimethylaniline, 2,5-dimethoxyaniline, o-cyanoaniline, 2,5-dichloroaniline, 2-bromoaniline, 5-chloro-2-methoxyaniline, and 3-phenoxyaniline. These anilines or o- or m-substituted anilines may be used alone, or may be used in a form of a mixture of two or more kinds.

A weight average molecular weight of polyaniline is not particularly limited, but is preferably not less than 3000 and not more than 30000. When the molecular weight is less than 3000, there is a tendency that film forming property is deteriorated and, when the molecular weight exceeds 30000, polyaniline is hardly dissolved in a solvent. More preferably, the molecular weight is not less than 10000 and not more than 20000.

(Process for Producing Electrically Conductive Polyaniline Composition)

The present process for production comprises a doping step of doping polyaniline using the present dopant, and a step of collecting fractions containing doped polyaniline. The doping step is preferably performed by mixing both of them in a solvent. By mixing polyaniline and the present dopant to contact polyaniline with the present dopant, to dope polyaniline, electrical conductivity can be imparted and, at the same time, by becoming a polymer blend with the present dopant, new property is imparted. Without restricting the present invention, it is presumed that, by mixing the present dopant and polyaniline in the solution or melt state, a phenolic hydroxy group in the present dopant having a better linear structure is interacted with polyaniline and, moreover, solubility in and compatibility with various solvents, and softening/flowing properties possessed by the present dopant impart excellent processability to polyaniline. In addition, recycling property possessed by the present dopant is imparted to the present composition.

(Solution Mixing Method)

As a process for producing the present composition, a solution mixing method will be explained. The solution mixing method is a method well-known in doping of polyaniline. In the case of solution mixing, polyaniline and the present dopant may be placed into a solvent at the same time, and this may be mixed, or into a solution obtained by placing one of them in a solvent to dissolve it in advance may be placed the other, or respective solutions are prepared, and both of them may be mixed. The present dopant and polyaniline may be placed and mixed in one portion, or they may be sequentially placed such as gradual mixing of them and addition dropwise of both of them to a solvent. As already described, in the present composition, the dedoped state (Emeraldine base) is used, or polyaniline in the doped state (Emeraldine salt) may be used. In polyaniline in the doped state, protonic acid which has previously been used in this kind of doping is used. In addition, at mixing, protonic acid may be added, and doping may be used with the present dopant and protonic acid, and this will be described later.

As a solvent used upon solution mixing, it is preferable to use a solvent having no reactivity with the present dopant. Examples include alcohols such as methyl alcohol, ethyl alcohol, isopropyl alcohol, n-propyl alcohol, n-butyl alcohol, sec-butyl alcohol, tert-butyl alcohol, isobutyl alcohol and the like; ketones such as acetone, methyl ethyl ketone, diethyl ketone and the like; ethers such as dioxane, tetrahydrofuran and the like; cyclic amines such as 2-methyl-N-pyrrolidone, pyrrolidone and the like; aromatic amines such as pyridine, pyrrole and the like; amides such as dimethylformamide, dimethyl sulfoxide and the like. Alternatively, a mixed solution of these and water may be used. These solvents may be used alone, or may be used by combining two or more kinds.

Preferable are dimethylformamide, dimethyl sulfoxide, tetrahydrofuran and N-methyl-2-pyrrolidone, more preferable are tetrahydrofuran and N-methyl-2-pyrrolidone, and further preferable is 2-methyl-N-pyrrolidone.

In addition, in the solution mixing method, the method may be performed in the presence of protonic acid in order to improve a polyaniline doping efficiency. As protonic acid, protonic acids which have previously been used can be used similarly. For example, an inorganic acid such as hydrochloric acid, sulfuric acid, nitric acid, borohydrofluoric acid, perchloric acid, amidosulfuric acid and the like; an organic acid such as benzenesulfonic acid, p-toluenesulfonic acid, m-nitrobenzoic acid, trichloroacetic acid, acetic acid, propionic acid and the like; a polymer acid such as polystyrenesulfonic acid, polyvinylsulfonic acid, polyvinylsulfuric acid and the like can be used, being not limiting. These protonic acids may be used alone, or may be used in a form of a mixture of two or more kinds.

In the solution mixing method, in order to uniformly mix the present dopant and polyaniline to improve a doping efficiency, physical stirring means such as various mechanical stirring means and an ultrasound can be used.

The mixing condition in the present invention is not particularly limited as far as it is the condition under which doping of polyaniline sufficiently progresses with the present dopant. For example, a mixing temperature is preferably not lower than 0° C. and not higher than 100° C. In view of thermal stability of a lignophenol derivative, more preferable is 20° C. to 40° C. In addition, a mixing time is preferably not shorter than 12 hours and not longer than 48 hours, more preferably about 24 hours.

Upon production of an electrically conductive polyaniline composition, in view of objective electrical conductivity, processing property, and the production state of the present composition, a ratio of blending the present dopant and polyaniline can be selected. Preferably, the present dopant is 100 parts by weight or more relative to 100 parts by weight of polyaniline, because when the amount is less than 100 parts by weight, sufficient doping effect is not obtained. When a solution fraction or a dispersion fraction of mixed solution is obtained as the present composition, the amount is preferably not less than 300 parts by weight. In addition, in view of conversion into a film by a method of casting the solution fraction or the dispersion fraction, the amount is preferably not more than 2000 parts by weight, because when the amount exceeds 2000 parts by weight, there is a tendency that it becomes difficult to form a film by a casting method. More preferably, the amount is not more than 1900 parts by weight. From the forgoing, regarding the solution fraction or the dispersion fraction, it is preferable that the amount is not less than 300 parts by weight and not more than 1900 parts by weight relative to 100 parts by weight of polyaniline.

When an aggregate fraction of the mixed solution is obtained as the present composition, it is preferable that the present dopant is not less than 100 parts by weight and not more than 300 parts by weight relative to 100 parts by weight of polyaniline.

When both are mixed in a solvent as described above, there are the case where a uniform green (color of Emeraldine salt) mixed solution is obtained, the case where a green solution or a dispersion (of fine particles) and a green aggregate or precipitate is obtained (hereinafter, referred to as aggregate), the case where a green aggregate is mainly obtained, and so on. That is, according to the present process, any of an electrically conductive polyaniline composition in the state of a solution in which the composition is dissolved in a solvent or a dispersion in which the composition is uniformly dispersed in a solvent, and an electrically conductive polyaniline composition which is an aggregate, or a combination of two or more kinds can be obtained. A fraction containing doped polyaniline also includes a lignin derivative which is a dopant. In a composition in either state, electrical conductivity can be manifested. In the mixed solution, since it is presumed that polyaniline and a lignin derivative are present in an aggregate fraction containing an aggregate at a high concentration, this is more preferable as the present composition than the solution fraction or the dispersion fraction in the mixed solution in some cases. The production form of such the electrical conductive polyaniline composition is different depending on a material (e.g. resin) of a lignin derivative used as the present dopant, or a kind of a solvent and a composition of the present dopant and polyaniline.

The desired present electrically conductive composition can be obtained by adjusting a concentration by appropriately distilling a solvent off, or separating as a polymer blend, in a solution or a dispersion containing doped polyaniline. In addition, an aggregate containing doped polyaniline can be separated by the known preparative method such as filtration and centrifugation and, if necessary, washed, dried and so on to obtain a desired present electrically conductive composition. The thus obtained present composition can be formulated into various solids such as powders, pellets, chips and the like, solutions, pastes or the like. Alternatively, suitable additives, solvents or the like can be added to the resulting present composition, and this can be mixed to obtain a composition suitable for utilities.

In addition, since the present composition is a polymer blend of polyaniline and a lignin derivative, it can be used as a molding material in various methods which are applied to a polymer. Particularly, according to the present invention, even when a lignin derivative which has previously been inferior in film processability is used as a main component, the present composition is a composition which can be formed into a film. Upon formulation of a film, the known coating method or casting method can be used. Therefore, as one aspect of the present invention, there can be exemplified a film containing the present composition, mainly containing the present composition, or containing only the present composition.

The thus obtained present composition is an electrically conductive polyaniline composition doped with a dopant having no high acidity functional group such as a sulfonic acid group and a carboxyl group. Since the present composition is a polymer blend, interaction between molecules easily occurs, and desorption doping has become difficult. In addition, since the present dopant has not high acidity, even when dedoped, there is an advantage that it has little influence on other material in the state where the material can be contacted with the present dopant due to its acidity. In addition, since the present composition is a polymer blend of polyaniline and a lignin derivative, properties of both of them are exerted and, furthermore, properties of a polymer blend can be controlled by a compositional ratio of them.

In addition, according to the present composition, since the composition has, as a constitutional component, a lignin derivative which can be recycled and is outcome from a forest source, dependency on a petroleum source is decreased, and an electrically conductive composition having small environmental load is provided. In addition, a lignin derivative is derived from lignin, and is a material having high affinity with cellulose and hemicellulose which take a composite structure in an organism. For this reason, according to the present composition, a composition having affinity with a plantbased material such as lignin, cellulose and hemicellulose in addition to electrical conductivity is provided.

In addition, a lignin derivative widely functions as a binder for various materials, by itself, or by exerting binding property by heating or distilling off a solvent from the solution state. Therefore, according to the present invention, a polyaniline-based composition having such the binder utility is provided. In addition, according to the present invention, an electrically conductive adhesive containing the present composition is provided. Furthermore, a lignophenol derivative has various secondary derivatives, and control of crosslinking property, and control of a degree of cutting (at a first unit forming site) of a molecular chain by an alkali are possible. Therefore, according to the present invention, a composition which can easily control crosslinking property and degradability in addition to electrical conductivity due to polyaniline is provided.

On the other hand, according to the present composition, it can also be said that, by making a lignin derivative function as a dopant, electrical conductivity is imparted to a lignin derivative. A lignin derivative was a phenol-based insulating polymer suitable for sequential utilization and circulation use, but according to the present invention, a composition which is a lignin derivative system and has utility as various electrical conductive material is provided.

In addition, the present composition has excellent film processability due to polyaniline. Since a lignin derivative itself was inferior in film processability, according to the present invention, a composition which is a lignin derivative system and is used for film processing is provided.

From the forgoing, the present composition can be used as various antistatic utilities, a transparent electrode (green to blue), an electromagnetic shielding material, a photoelectric transducing element, an organic electroluminescent element, an organic electrochromic element, a rust preventive, a semiconductor photocatalyst, a photoresist, a nonlinear optical material, a polymer material for a fuel cell or the like, which are the previous utilities of polyaniline. In addition, the present composition can be used as a binder, a molding material, various adsorbing materials, or an absorbing material and, at the same time, as a material having electrical conductivity, which are utilities mainly of a lignin derivative. That is, the present composition can be used as an electrically conductive adhesive, an electrically conductive molding material, an electrically conductive adsorbing material, or an electrically conductive absorbing material. In these various utilities, the composition of the present invention can appropriately take a film-like form, a sheet-like form, or a form of a molded article having a three-dimensional form other than those forms. Therefore, as one form of the present invention, there can be exemplified a molded article containing the present composition, mainly containing the present composition, or containing only the present composition. In addition, the present composition can be complexed with various materials like other polymers.

(Cellulose-based Material)

A cellulose-based material includes an artificial cellulose-based material such as a waste, a recycled product and an artificially synthesized cellulose-based fiber, in addition to a processed product such as a paper, a pulp and the like. Further, a cellulose-based material includes a lignocellulose-based material of various shapes such as fibrous shape, chip-shape and the like. Examples of a form of these cellulose-based materials include an aggregate, an interlacing body, and a molded body of cellulose-based materials which is in the dispersed state, in addition to various dispersion forms such as a powder, a short fiber, a long fiber, a chip and the like. Preferable examples include, in addition to a fibrous body, an aggregate thereof, an interlacing body thereof, and a dense body. As an external form when a cellulose-based material is in the non-dispersed state, a material can be formulated into a sheet-like body, or a three-dimensional shaped molded body other than a sheet-like body. In the case of a sheet-like body, an interlacing body of a cellulose-based fiber including a so-called paper and various processed papers is preferable. This is because, by being such the interlacing body, polyaniline or a lignin derivative is easily retained.

(Complexing with Cellulose-based Material)

An electrically conductive polymer material can be complexed with various materials like other polymers. Inter alia, it is preferable that the present polymer material is complexed with a cellulose-based material. Being inference and without restricting the present invention, the present polymer material has excellent adherability with a cellulose-based material. It is thought that this excellent adherability is approximately equal to adherability between a lignin derivative and a cellulose-based material. Therefore, by complexing the present polymer material with a cellulose-based material, a composite material in which polyaniline and a lignin derivative are accursedly retained in a cellulose-based material, and which stably manifests electrical conductivity and, at the same time, is firm and is excellent in following property depending on a form of a cellulose-based material can be obtained. In addition, the present composite material has higher electrical conductivity than electrical conductivity which is predicted from electrical conductivities of the present polymer material alone and a cellulose-based material alone, and it is presumed that, by complexing the present polymer material with a cellulose-based composite material, electrical conductivity is synergistically improved by interaction between materials in a combination of these materials.

A form of the present polymer material used in complexing is not particularly limited, but a solid such as a powder, a fiber, a film and the like, a solution, a dispersion, a paste and the like can be selected, if necessary. These may be used by combining them. Preferably, the present polymer material may be formulated into a solution, a dispersion or a paste. In addition, preferably, a material can be formulated into a powder or a film of polyaniline. In addition, an origin of the present polymer material does not matter. A form may be a solution or a dispersion obtained in the aforementioned process, a concentrate thereof, a dried material, as well as an insoluble of an aggregate fraction obtained in the aforementioned process, or a dry material. Alternatively, two or more kinds of them may be combined.

In addition, a method of complexing the present polymer material and a cellulose-based material is not particularly limited, but various methods can be adopted. Upon complexing, it is enough that the present polymer material is supplied to a cellulose-based material, and this is retained in a cellulose-based material. For example, for supplying the present polymer material in a form of a solution, a dispersion or a paste to a cellulose-based material, immersion or various coating procedures can be used. Then, by removing a solvent accompanied with the present polymer material or heating to such a degree that the present polymer material is softened, the present polymer material can be retained in a cellulose-based material. In addition, accompanying with retention of the present polymer material in a cellulose-based material, the materials may be pressurized.

In addition, for supplying the present polymer material of a powder shape or a fiber shape to a cellulose-based material, for example, a dry mixing method or the like can be adopted. Alternatively, the film-like present polymer material may be supplied by laminating the present polymer material with a cellulose-based material of a sheet-shape or the like. Then, by heating to such a degree that the present polymer material is softened, the present polymer material which is a solid can be retained by a cellulose-based material. Also in this case, accompanying with retention, materials may be pressurized.

In addition, when the present polymer material is retained by a cellulose-based material in a dispersed form of a fiber, a powder or the like by supplying the present polymer material to the cellulose-based material, by maintaining the dispersed state of a cellulose-based material, a composite material in the dispersed form can be obtained. That is, a composite material which is a fiber-like, a powder-like, a chip-like or the like can be obtained. For example, by impregnating a cellulose-based material in a dispersed form such as a fiber and the like with a solution of the present polymer material and distilling off the solvent, a composite material in the dispersed state can be easily obtained. Alternatively, by using this composite material in the dispersed form, a composite material as a molded article may be formed.

When the present polymer material is retained in a cellulose-based material in the dispersed state, the aggregated state, the interlacing state or the like by supplying the present polymer material to the cellulose-based material, heat and/or a pressure is applied and, at the same time, a desired three-dimensional shape (sheet-like or other three-dimensional shape) is imparted, thereby, a molded article can be obtained at the same time with retention of a polymer material. Alternatively, by supplying the present polymer material to a cellulose-based material (which may be a provisional molded article) to which a desired shape has been imparted in advance, and performing solvent distillation, and addition of heat and/or pressure, a molded body in which the present polymer material is retained in the cellulose-based material, can be obtained. As a method of obtaining these molded articles, a procedure similar to a process for producing the molded article using a lignin derivative as a binder described in JP-A No. 9-278904 can be used.

The present composite marital can be also obtained directly from the aforementioned solution mixing method. For example, in order to most effectively supply the present polymer material contained in a mixed solution obtained in the aforementioned solution mixing method to a cellulose-based material, the following method can be adopted. The whole mixed solution, that is, a solution fraction and an insoluble fraction are filtered with a cellulose-based material using the cellulose-based material which has been molded, or is in the integrated state as a filter. By doing so, the present polymer in a solution, and the present polymer as an insoluble part or an aggregate are supplied to a cellulose-based material. In addition, for example, by placing a cellulose-based material in the dispersed state into a mixed solution, and mixing and stirring this, a polymer material in a solution and a present polymer as an insoluble can be supplied to a cellulose-based material in the dispersed state. Furthermore, by distilling off a solvent from a cellulose-based material to which the present polymer material has been thus supplied and, if necessary, performing heating or heating and pressuring to such an extent that the present polymer material is softened, the present polymer material can be retained in a cellulose-based material. In addition, upon separation of a cellulose-based material in the dispersed state from a mixed solution, by separating a cellulose-based material so as to make a paper-like material, a sheet-like composite material can be easily obtained.

The present composite material contains the present polymer material, that is, polyaniline doped with a lignin derivative, and a cellulose-based material. For this reason, the material is a cellulose-based composite material equipped with electrical conductivity. In addition, a lignin derivative is excellent in binding property and adherability with a cellulose-based material and, in the state where polyaniline is doped, binding property with a cellulose-based material is further improved, For this reason, the present composite material is an electrically conductive composite material which is excellent in integrity, and can stably maintain the doped state and, at the same time, is a composite material excellent in flexibility with is characteristic of a cellulose-based material. Particularly, when a cellulose-based material is a sheet-like body in which cellulose-based fibers are interlaced, a composite material which is excellent in electrically conductivity and is excellent in flexibility can be obtained.

The present composite material may contain components other than the present polymer material and the cellulose-based material. Such the other components may be contained in such a range that the object of the present composite material is not prevented and, for example, a particulate, fibrous or chip-like powder of a metal, a ceramic, a glass, a synthetic or natural resin, a rubber or the like can be used. Alternatively, the present composite material may be a part of other molded article. For example, by adopting a layer consisting of the present composite material as one layer constituting a laminate, a single molded article can be constructed together with other material.

EXAMPLE 1

Examples which are embodiments of the present invention will be explained below, but the present invention is not limited to the following Examples.

Preparation 1 of Lignophenol Derivative

About 1.0 g of a defatted sample of a wood flour (lignocellulose-based material) of *Tsuga heterophylla* was taken into a 50 ml-volume beaker, p-cresol (corresponding to a phenol compound at 3 mole-fold amount per lignin C9 unit) was added, and the mixture was stirred with a glass bar. Thereafter, 5 ml of 72 wt % sulfuric acid was added, this was vigorously stirred at 30° C. for 1 hour, and separated into two phases of phenol/acid by centrifugation (3500 rpm, 10 minutes, 25° C.), only the phenol layer was taken out, and placed into large excessive of ethyl ether, an insoluble section was dissolved in acetone, this was placed into large excessive of diethyl ether again, and a solvent was removed to obtain a lignophenol derivative (ligno-p-cresol) derived from *Tsuga heterophylla*.

EXAMPLE 2

Preparation 2 of Lignophenol Derivative

About 550 g of a defatted sample of a wood flour (lignocellulose-based material) of *Tsuga heterophylla* was taken into a 1000 ml-volume beaker, p-cresol (corresponding to 3 mole-fold amount per lignin C9 unit) was added to allow p-cresol to be permeated, 500 ml of 72 wt % sulfuric acid was added thereto, this was vigorously stirred at 30° C. for 1 hour, the mixture was placed into large excessive water, and an insoluble section was recovered by centrifugation (3500 rpm, 10 minutes, 25° C.), deacidified, and lyophilized to obtain a lignophenol derivative (ligno-p-cresol) derived from *Tsuga* heterophylla. Properties of the *Tsuga heterophylla*-derived lignophenol derivative obtained in Example 2 were such that a phenolic hydroxy group amount was 1.33 mol/C9 unit, an aliphatic hydroxy group amount was 0.58 mol/C9 unit, a phenol introduction rate was 0.75 mol/C9 unit, and a weight average molecular weight was 14200.

EXAMPLE 3

Preparation of Electrically Conductive Composition and Electrically Conductive Composite Material Each 10 mg/ml N-methyl-2-pyrrolidone solution of two kinds of *Tsuga heterophylla*-derived lignophenol derivatives prepared in Example 1 and Example 2 was prepared. A 10 mg/ml N-methyl-2-pyrrolidone solution of basic polyaniline (manufactured by Aldrich) having a weight average molecular weigh of 20,000 was prepared. These respective solutions were added at once at a ratio shown in Table 1, and this was stirred and mixed for 24 hours to prepare a mixed solution of samples 1 to 5. A series of procedures were performed at room temperature.

TABLE 1

| | Binding ratio (part by weight) | | Linear electrical conductivity ($10^{-10}$Scm$^{-1}$) | |
|---|---|---|---|---|
| | Polyaniline | Lignophenol derivative | Film | Composite material |
| 1 | 100 | 100 | 0.22 | 180 |
| 2 | 100 | 300 | 67.5 | 422 |
| 3 | 100 | 900 | 0.24 | 1780 |
| 4 | 100 | 100 | 37.9 | 31400 |
| 5 | 100 | 300 | 41.7 | 38600 |
| Comparative Example | 100 | 0 | 0.05 | 2 |
| Control Example (5C filter) | | | 0.14 | |

In samples 1 to 5, when a blending ratio of a lignophenol derivative was 100 parts by weight or 300 parts by weigh relative to 100 parts by weight of polyaniline, a green aggregate was produced and precipitated in a green solution and, when a blending ratio of a lignophenol derivative was 900 parts by weight, a precipitate was not produced, and a green solution or a dispersion of fine particles was obtained. Each mixed solution of all samples 1 to 5 was filtered under reduced pressure with a 5C filter, and a green solution or a fine particle dispersion was recovered as a filtrate, and a precipitate was recovered as a filtered material on a 5C filter. The filtrate recovered from each sample was cast as it was on a plate heated at 60° C. to prepare a film (26 mm×25 mm), which was used as a film sample. In addition, a precipitate on a 5C filter was washed with N-methyl-2-pyrrolidone a few times, and a solvent was distilled off to obtain a sample of a composite material with a cellulose-based material.

In addition, as Comparative Example, a polyaniline 10 mg/ml NMP solution was prepared, this was filtered under reduced pressure similarly using a 5C filter, and a polyaniline film was prepared from the resulting filtrate. In addition, a filter used was handled as a composite material. In addition, as Control Example, only a 5C filter was used. In these Comparative Examples and Control Examples, electrical conductivity was measured as in Examples.

EXAMPLE 4

Electrical Conductivity Assessment

Regarding the film samples and the composite material samples prepared in Example 3, electrical conductivity was measured with a potentiostat connected to a quadricpolar terminal, respectively. Results are also shown in Table 1.

As shown in Table 1, all of film samples and composite material samples showed higher electrical conductivity than that of polyaniline which is Control Example. From this, it was seen that a lignophenol derivative can protonate polyaniline to manifest electrical conductivity. In addition, between film samples and composite material samples, higher electrical conductivity was obtained in composite material samples. Particularly, in the composite material sample of a *Tsuga heterophylla*-derived lignophenol derivative of Example 2, electrical conductivity was improved at a $10^5$ level as compared with a composite material of a 5C filter and polyaniline which is Control Example. In addition, a 5C filter, polyaniline and a lignophenol derivative were adhered firm, and could not be separated even when washed or rubbed.

From the forgoing, it was seen that a lignophenol derivative can function as a polyaniline dopant although there is a variation depending on an origin (tree species etc.) of a lignophenol derivative and a process for producing a lignophenol derivative. In addition, it was seen that even in the case of a solution fraction or a fine particle dispersion fraction obtained by the solution mixing method, an electrical conductive composition is obtained. In addition, since an electrical conductive polyaniline composition is strongly adhered with a cellulose-based material, it was seen that the composition also exerts binder function originally found in a lignophenol derivative even in the polymer blend state.

The invention claimed is:

1. An electrically conductive polyaniline composition, comprising:
   polyaniline, and
   one or more kinds of lignin derivatives selected from the group consisting of the following lignin derivatives (a) to (e);
   (a) a phenol derivative of lignin having a 1,1-bis(aryl) propane unit in which a carbon atom on an ortho-position and/or a para-position relative to a phenolic hydroxy group of a phenol compound is bound to a carbon atom on a C1 site of an aryl propane unit of lignin,
   (b) an acyl derivative having an acyl group in the lignin derivative (a),
   (c) a carbonyl derivative having a carboxyl group or a group derived from a carboxyl group in the lignin derivative (a),
   (d) a coumaran derivative in which an introduced phenol compound in the 1,1-bis(aryl)propane unit of the lignin derivative (a) is coumaranized, and
   (e) a crosslinking derivative having a crosslinking reacting group on an ortho-position and/or a para-position of a phenolic hydroxy group of a lignin derivative of (a).

2. The electrically conductive polyaniline composition according to claim 1, wherein the lignin derivative is the lignin derivative (a).

3. The electrically conductive polyaniline composition according to claim 1, wherein a phenolic hydroxy group amount of the lignin derivative is not less than 0.5 mol/nine carbons unit and not more than 2.0 mol/nine carbons unit.

4. The electrically conductive polyaniline composition according to claim 1, wherein the lignin derivative has a weight average molecular weight of not less than 500 and not more than 20000.

5. The electrically conductive polyaniline composition according to claim 1, wherein the phenol compound in the lignin derivative is o-cresol and/or p-cresol.

6. The electrically conductive polyaniline composition according to claim 1, wherein the lignin derivative is a derivative obtained by solvating a lignin-containing material with the phenol compound, and adding an acid.

7. The electrically conductive polyaniline composition according to claim 1, wherein the lignin derivative is contained at not less than 100 parts by weight and not more than 2000 parts by weight relative to 100 parts by weight of the polyaniline.

8. A molded resin, containing an electrical conductive polyaniline composition according to claim 1.

9. The molded resin according to claim 8, being a film-like body.

10. An electrical conductive adhesive, comprising an electrical conductive polyaniline composition according to claim 1.

11. A process for producing an electrically conductive polyaniline composition, comprising:
    a doping step of doping polyaniline using one or more kinds of lignin derivatives selected from the group consisting of the following lignin derivatives (a) to (e);
    (a) a phenol derivative of lignin having a 1,1-bis(aryl)propane unit in which a carbon atom on an ortho-position and/or a para-position relative to a phenolic hydroxy group of a phenol compound is bound to a carbon atom on a C1 site of an aryl propane unit of lignin,
    (b) an acyl derivative having an acyl group in the lignin derivative (a),
    (c) a carbonyl derivative having a carboxyl group or a group derived from a carboxyl group in the lignin derivative (a),
    (d) a coumaran derivative in which an introduced phenol compound in the 1,1-bis(aryl)propane unit of the lignin derivative (a) is coumaranized, and
    (e) a crosslinking derivative having a crosslinking reacting group on an ortho-position and/or a para-position of a phenolic hydroxy group of the lignin derivative (a), and
    a collecting step of collecting fractions containing the doped polyaniline.

12. The process according to claim 11, wherein the doping step mixes the lignin derivative and polyaniline in a solvent.

13. The process according to claim 12, wherein the collecting step collects solution fractions or dispersion fractions containing doped polyaniline.

14. The process according to claim 12, wherein the collecting step collects aggregate fractions containing doped polyaniline.

15. An electrical conductive polyaniline composition obtained by a process according to claim 11.

16. An electrically conductive composite material, comprising:
    polyaniline,
    one or more kinds of lignin derivatives selected from the group consisting of the following lignin derivatives (a) to (e);
    (a) a phenol derivative of lignin having a 1,1-bis(aryl)propane unit in which a carbon atom on an ortho-position and/or a para-position relative to a phenolic hydroxy group of a phenol compound is bound to a carbon atom on a C1 site of an aryl propane unit of lignin,
    (b) an acyl derivative having an acyl group in the lignin derivative (a),
    (c) a carbonyl derivative having a carboxyl group or a group derived from a carboxyl group in the lignin derivative (a),
    (d) a coumaran derivative in which an introduced phenol compound in the 1,1-bis(aryl)propane unit of the lignin derivative (a) is coumaranized, and
    (e) a crosslinking derivative having a crosslinking reacting group on an ortho-position and/or a para-position of a phenolic hydroxy group of the lignin derivative (a), and
    a cellulose-based material.

17. The composite material according to claim 16, wherein the cellulose-based material is any of a cellulose-based fiber, an aggregate thereof, an interlacing body thereof and a dense body thereof.

18. The composite material according to claim 16, wherein the cellulose-based material is a sheet, or a molded material having a three-dimensional shape.

19. A process for producing an electrically conductive composite material, comprising:
    a complexing step of supplying, to a cellulose-based material, polyaniline doped with one or two or more kinds of lignin derivatives selected from the group consisting of the following lignin derivatives (a) to (e);
    (a) a phenol derivative of lignin having a 1,1-bis(aryl)propane unit in which a carbon atom on an ortho-position and/or a para-position relative to a phenolic hydroxy group of a phenol compound is bound to a carbon atom on a C1 site of an aryl propane unit of lignin,
    (b) an acyl derivative having an acyl group in the lignin derivative (a),
    (c) a carbonyl derivative having a carboxyl group or a group derived from a carboxyl group in the lignin derivative (a),
    (d) a coumaran derivative in which an introduced phenol compound in the 1,1-bis(aryl)propane unit of the lignin derivative (a) is coumaranized, and
    (e) a crosslinking derivative having a crosslinking reacting group on an ortho-position and/or a para-position of a phenolic hydroxy group of the lignin derivative (a), to retain the material in the cellulose-based material.

20. The process according to claim 19, wherein any of a solution, a dispersion and a paste of the doped polyaniline is supplied to the cellulose-based material in the complexing step.

21. The process according to the claim 19, wherein a powder of the doped polyaniline is supplied to the cellulose-based material in the complexing step.

22. The process according to claim 19, wherein a film of the doped polyaniline is supplied to the cellulose-based material in the complexing step.

23. The process according to claim 19, wherein prior to the complexing step, said process comprises a doping step of mixing the lignin derivative and the polyaniline in a solvent and, in the complexing step, a fraction containing doped polyaniline is supplied to the cellulose-based material.

24. The process according to claim 23, wherein doped polyaniline contained in an insoluble fraction of a mixed solution in the doping step is supplied to the cellulose-based material.

25. The process according to claim 23, wherein doped polyaniline contained in an insoluble fraction and a solution fraction of a mixed solution in the doping step is supplied to the cellulose-based material.

26. The process according to claim 23, wherein the cellulose-based material is any of a cellulose-based fiber, an aggregate thereof and an interlacing body thereof.

27. The process according to claim 19, wherein in order to retain the doped polyaniline in the cellulose-based material in the complexing step, a solvent accompanied with the doped polyaniline is distilled off, or heating is performed to such a degree that any of polyaniline in the doped polyaniline or the lignin derivative is softened.

* * * * *